United States Patent [19]

Sugiura

[11] 4,339,190
[45] Jul. 13, 1982

[54] ELECTROMAGNETICALLY DRIVEN FOCAL PLANE SHUTTER

[75] Inventor: Yoji Sugiura, Yokohama, Japan

[73] Assignee: Canon Kabushiki Kaisha, Tokyo, Japan

[21] Appl. No.: 223,420

[22] Filed: Jan. 8, 1981

[30] Foreign Application Priority Data

Jan. 8, 1980 [JP] Japan .................................. 55-659

[51] Int. Cl.³ .............................................. G03B 9/36
[52] U.S. Cl. .................................... 354/234; 354/246
[58] Field of Search ............... 354/133, 146, 147, 234, 354/235, 288, 245–250, 261–265; 310/42, 88, 89; 335/260, 278, 299

[56] References Cited

U.S. PATENT DOCUMENTS 4,149,794  4/1979  Takahama et al. ............. 354/234 X

FOREIGN PATENT DOCUMENTS 54-8522   1/1979  Japan .................................. 354/288
1442697   5/1974  United Kingdom ................ 354/234

Primary Examiner—L. T. Hix
Assistant Examiner—William B. Perkey
Attorney, Agent, or Firm—Toren, McGeady & Stanger

[57] ABSTRACT

A process for producing an electromagnetically driven focal plane shutter including the steps of assembling an electromagnetic drive source and transmission members in a drive unit and the shutter blade groups in a shutter blade unit, and then assembling these units in a final unit.

4 Claims, 3 Drawing Figures

ELECTROMAGNETICALLY DRIVEN FOCAL PLANE SHUTTER

BACKGROUND OF THE INVENTION

1. Field of the Invention

This invention relates to electromagnetically driven shutters, and more particularly to focal plane shutters of the type in which the leading and trailing blade groups each consist of a plurality of thin blades and are driven to move for exposure purposes by respective electromagnetic forces.

2. Description of the Prior Art

In known shutters of the aforementioned type, the shutter is generally arranged with the leading and trailing blade groups and electromagnetic drive sources therefor on a common base plate. It is required to build strong permanent magnets in such electromagnetic drive sources. To fulfil this requirement, it is preferred to use recently developed rare earth element magnets.

The rare earth element magnets are, however, very fragile and, therefore, liable to chip during handling. After being magnetized, because of its strong magnetic field, the magnet must be isolated from any magnetic substances and maintained a large distance therefrom during the assembling process. It is absolutely forbidden that foreign particles be allowed to migrate into the electromagnetic drive source unit as is attracted by the magnetized rare earth element when in assembling. For this reason, the assembling step which follows the magnetizing step must be all carried out in a dust proof chamber or the like. The provision of this dust proof chamber involves very high cost. Therefore, the employment of an assembling process which requires that all treatment be performed in a perfect dust proof chamber leads to an extremely heavy investment. This is not beneficial because of a substantial influence on the production cost.

SUMMARY OF THE INVENTION

An object of the present invention is to eliminate all the above-described drawbacks and to provide an electromagnetically driven type focal plane shutter constructed from a drive portion unit including electromagnetic drive sources, driving torque transmitting members and accessory parts such as an X-contact and a shutter start switch, and a shutter blade unit including a shutter base plate, leading and trailing blade groups and a cover plate, whereby what is required to be assembled in the dust proof chamber is limited to only the parts of the drive unit after the magnetizing step.

According to the present invention, only those of the steps of the drive portion unit assembling process which follow the magnetizing steps are carried out in the dust proof chamber, and the assembled drive portion unit after having been air-tightly shielded is transferred to the subsequent step. Thus, the investment for the facility of the dust proof chamber is minimized.

Another advantage is that since the drive portion unit can be perfectly adjusted in itself, tested for the necessary performances, for example, the magnitude of driving torque output, the synchronous actuation of the X-contact, the contact efficiency, and the reliability of actuation of the shutter start switch and readjusted in the braking action, when it is combined with the shutter blade unit assembled on the separate production run, the possibility of necessitating the readjustment of the final unit in view of the shutter test is substantially reduced. Thus, simple assembling and adjusting techniques are made amenable, while nevertheless the resultant shutter is sure to be of high-precision.

The present invention will next be described in connection with an embodiment thereof by reference to the accompanying drawings.

DESCRIPTION OF THE PREFERRED EMBODIMENT

Figure 1:
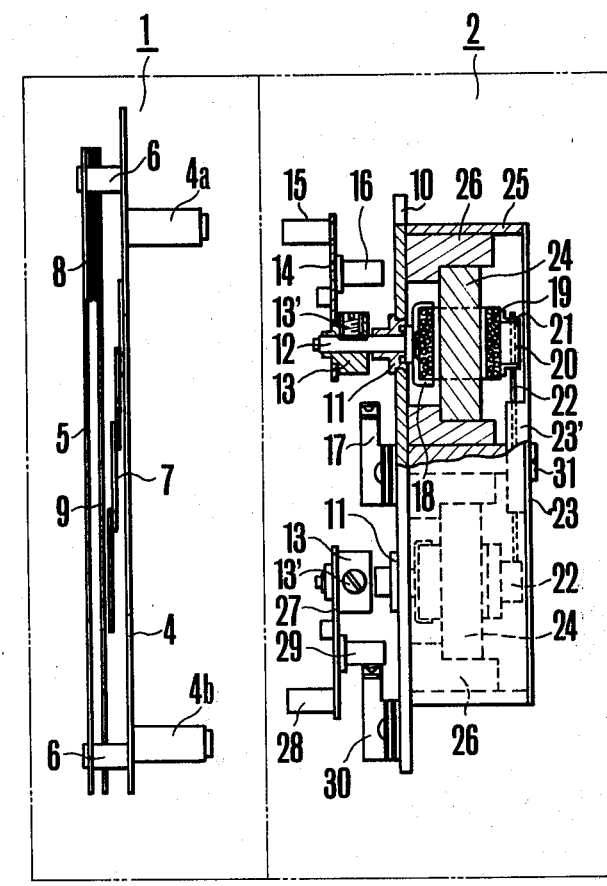
FIG. 1 is an elevational view of one embodiment of a shutter blade unit and a drive portion unit of the shutter according to the present invention in a position before assembly with a portion broken away to illustrate internal mechanisms.
Figure 2:
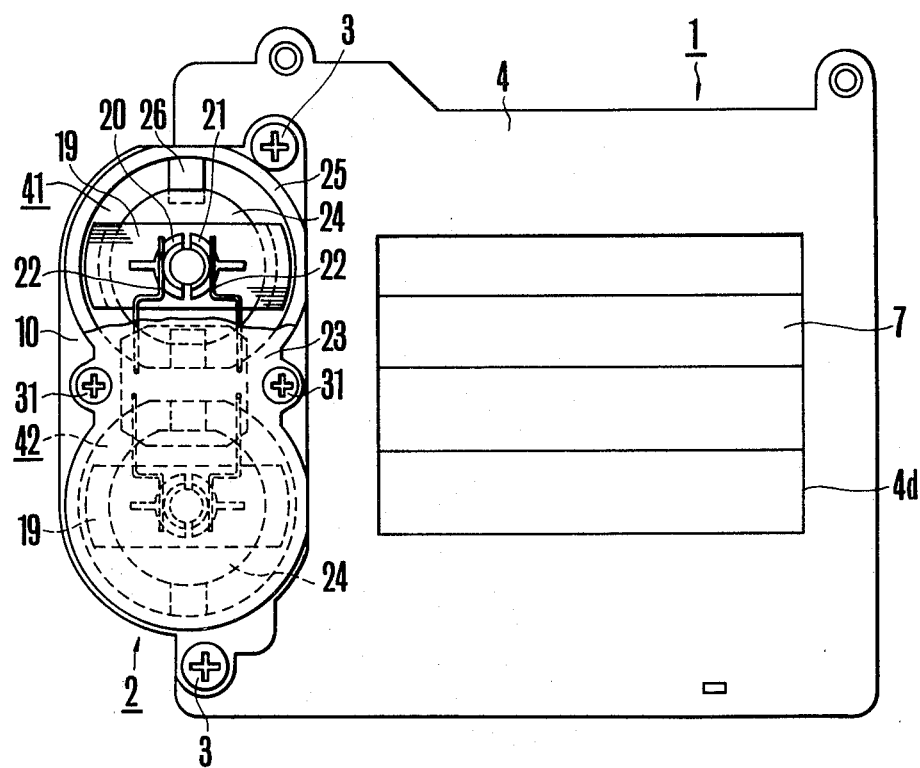
FIG. 2 is a front elevational view of a final unit.
Figure 3:
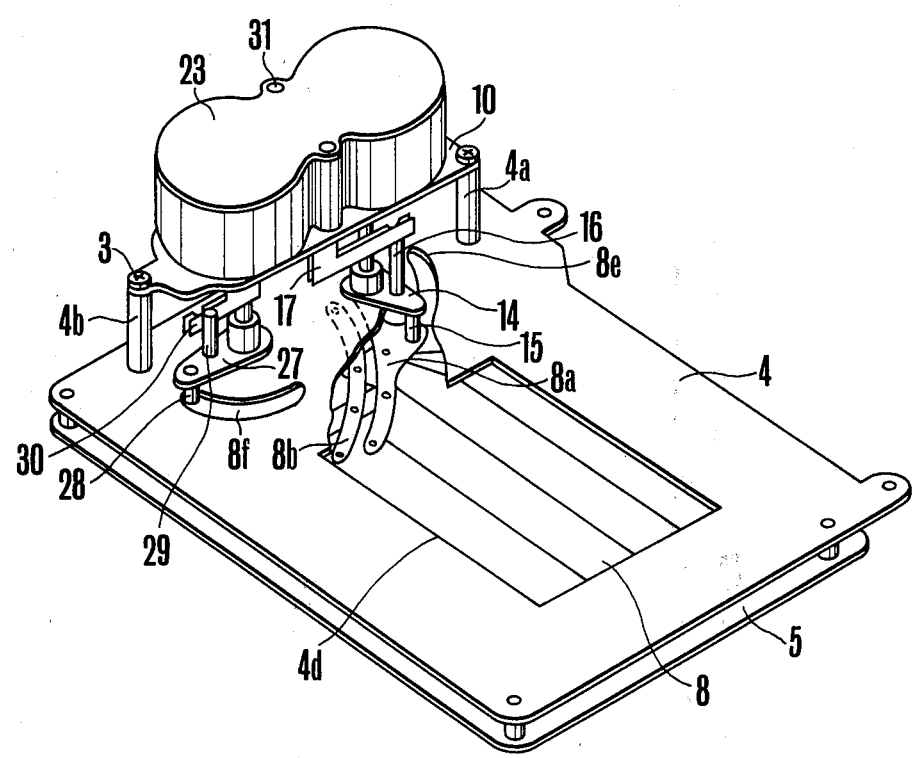
FIG. 3 is a perspective view of the final unit with a portion broken away.

In the drawings, 1 is a shutter blade unit, and 2 is a drive portion unit. 4 is a shutter base plate having an opening 4d for an exposure aperture, on one side of which are fixedly mounted support columns 4a and 4b for a drive portion base plate 10, and on the other side of which are pivotally supported a group of leading shutter blades 7 and a group of trailing shutter blades 8. The shutter blades groups 7 and 8 are each comprised of a plurality of thin blades linked by two arms and arranged upon rotation about a shaft on the base plate 4 to move in parallel with each other, whereby the exposure aperture opening 4d is opened and closed. In the position of FIGS. 1 and 2, the leading shutter blades group 7 covers the opening 4d, while the trailing shutter blades group 8 is retracted from the opening to one side thereof where the blades are stacked. In the position of FIG. 3, the trailing blade group 8 covers the aperture opening 4d. 8a is an operating arm for the trailing blades, and 8b is an auxiliary arm. An operating arm for the leading blades and an auxiliary arm therefor though not shown are similar in construction. The base plate 4 is provided with a plurality of pedestals 6 to hold thereon a cover plate 5 having a similar opening to that of the base plate in a predetermined separation from the base plate 4. By said cover plate 5, the leading and trailing blades groups are protected. 9 is a fixedly mounted partition plate for avoiding mechanical interference between the leading blade group 7 and the trailing blade group 8.

Mounted on the drive portion base plate 10 are moving coil type electromagnetic drive sources 41 and 42 for the leading and trailing shutter blade groups 7 and 8 respectively. In the drawings, 24 is a permanent magnet; 25 is a yoke which also serves as a casing of the electromagnetic drive source; 26 is a holder member for holding the permanent magnet, these parts being fixedly secured to the base plate 10 in a fashion known in the art. 19 is a moving coil arranged to be rotatable about the above-described magnet 24 in a predetermined range of angles. The moving coil 19 fixedly carries an output shaft 12. This shaft is supported by a bearing 11 provided in the base plate 10, and is connected through a fastener member 13 to a trailing shutter blade drive lever 14 or a leading shutter blade drive lever 27. The drive 14 is provided with a drive pin 15 for engagement with the above-described shutter operating arm and an actuating pin 16 for shutter running down movement of a terminal signal switch 17, is affixed to the fastener member 13 and after having been adjusted in relation to the moving coil 19 is affixed to the output shaft 12 by a screw fastener 13'.

On the coil 19 there are shown current supply portions 20 and 21 against which current supply brushes are pressed. 23 is a dust proof cover of non-conducting material covering the upper part of the yoke constituting part of the above-described casing and affixed to said yoke 25 by a screw fastener 31. At its central portion, there is provided a projected portion 23' for holding the current supply brush 22. The end portion of the current supply brush 22 is conducted out of the exposed surface of the dust proof cover and is connected through a lead wire and a switch (not shown) to a battery. 17 is a switch contact fixedly mounted on the base plate 10 and arranged to be closed when the trailing blade drive lever 14 rotates to terminate the movement of the trailing blade, as the pin 16 on the said lever 14 pushes it, whereby a shutter running down movement completion signal is produced. 27 is a leading blade drive lever affixed to the output shaft likewise as the above-described trailing blade drive lever 14 and provided with a drive pin 28 and an actuating pin 29 for an X-contact 30.

In a dust proof chamber, the above-described base plate 10, yoke 25, magnet 24, coil 19, output shaft 12 and bearing 11 are assembled, and after the magnet 24 is magnetized, additional necessary parts are further assembled, and after the necessary adjustment is made, the above-described dust proof cover is then attached, thus completing an electromagnetic drive source.

Then, the output shaft is assembled with the above-described drive levers 14 and 27 and adjusted in a predetermined positional relationship, and then assembled with the switches 17, 30 and adjusted to complete a drive unit 2. This drive unit 2 is loaded on the support columns 4a and 4b of the shutter blade unit 1 which has been produced from the separate assembling and adjustment line, and then fastened by screw fasteners 3, thus being assembled with the shutter blade unit.

During this operation, the shutter blade drive pins 15 and 28 are passed through arcuate slots 4e and 4f provided in the shutter base plate 4 to enter fitted holes of the shutter blade operating arms (in the drawings, only 8a is shown) so that rotation of the shaft 12 can be transmitted to the shutter blades. Thus, the final unit or the shutter is completed.

It will be seen from the foregoing that the present invention is to provide a process for producing an electromagnetically driven type focal plane shutter which enables the shutter blade unit and the drive portion unit to be set up separately from each other and after the assembling and adjusting steps, to be assembled in a final unit with an additional advantage that both units if finished to standards each are made interchangeable. A further advantage is that the assembly line can be simplified, and the precision of the article is improved.

While a specific embodiment of the invention has been shown and described in detail to illustrate the application of the inventive principles, it will be understood that the invention may be embodied otherwise without departing from such principles.

What is claimed is:

1. A focal plane shutter assembly of the electromagnetically driven type, comprising:

a shutter blade unit consisting essentially of a shutter base plate with an exposure aperture opening, a cover plate provided near said base plate, with a leading shutter blade group and a trailing shutter blade group respectively positioned between said base plate and said cover plate and respectively comprising a plurality of thin plates and a shutter operating member link connected to said thin plates to hold said thin plates in a swingable manner and being adjusted to effect a prescribed operation; and a shutter driving unit consisting essentially of a pair of electromagnetic driving sources which are so adjusted to produce a prescribed driving power and which respectively drive said leading shutter blade group and said trailing shutter blade group, a base plate supporting said electromagnetic driving sources and output shafts thereof, and a linking member which is attached to said output shafts and is so adjusted to effect a prescribed positional relationship with said shafts;

wherein said shutter assembly is arranged such that said shutter blade unit has support columns mounting said base plate of said shutter driving unit in a prescribed positional relationship and wherein both said units are combined so that the linking member of said driving unit engages with the shutter operating member of said shutter blade unit for operating said shutter assembly by operation of said electromagnetic driving sources.

2. An assembly according to claim 1 wherein said shutter driving unit includes an X-contact whose opening and closing operation is controlled in cooperation with said linking member.

3. An assembly according to claim 1 wherein said pair of electromagnetic driving sources include permanent magnets and moving coils having said output shafts attached thereto, said assembly including a yoke and dustproof cover with said permanent magnets and moving coils being shielded by said base plate, said yoke, and said dustproof cover in an airtight manner.

4. An assembly according to claim 3 wherein said dustproof covers are made of electrically nonconducting material and include current supply brushes for supplying current to said moving coils.

* * * * *